United States Patent Office 2,780,561
Patented Feb. 5, 1957

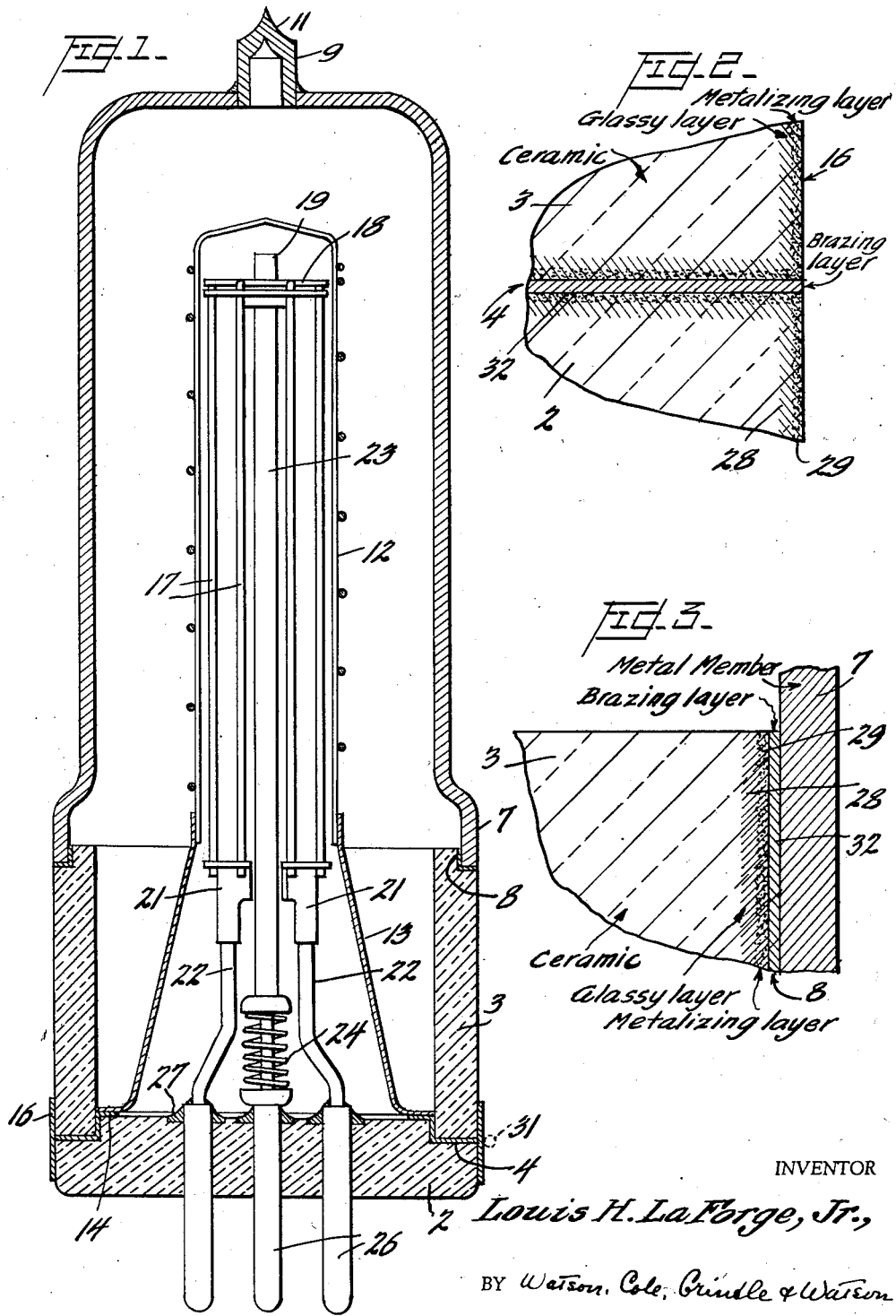

2,780,561

METHOD OF MAKING METALIZED CERAMIC STRUCTURES FOR VACUUM TUBE ENVELOPES

Louis H. La Forge, Jr., Palo Alto, Calif., assignor to Eitel-McCullough, Inc., San Bruno, Calif., a corporation of California Original application August 1, 1952, Serial No. 302,193. Divided and this application September 14, 1953, Serial No. 379,845

2 Claims. (Cl. 117—62)

This invention relates to the manufacture of vacuum tube envelope structures involving metalized ceramic materials, and more particularly to a method useful in the production of ceramic-to-ceramic and ceramic-to-metal seals for such structures. This application is a division of my copending application, Serial No. 302,193, filed August 1, 1952, now abandoned.

Ceramics, such as the alumina ceramic bodies, because of their mechanical strength and ability to withstand high temperatures, are much superior to conventional glass in the fabrication of vacuum tube envelopes. The main problem in utilizing ceramic bodies is to provide a reliable technique for making vacuum-tight ceramic-to-ceramic and ceramic-to-metal seals.

The principal object of my invention is to provide an improved method whereby a ceramic envelope section may be readily joined to another ceramic section or to a metal section of a tube envelope, producing a mechanically strong and vacuum-tight joint.

Another object is to provide an improved technique for metalizing the ceramic to produce a metal surface tightly bonded to the ceramic, which metalized area is suitable for brazing purposes or to provide a contact terminal.

The invention possesses other objects and features of advantage, some of which, with the foregoing, will be set forth in the following description of my invention, it being understood that such descriptive matter is merely illustrative of the principles of the invention, no limitation of the scope of the invention being thereby intended.

Referring to the drawing:

Figure 1 is a vertical sectional view of triode type of electron tube, illustrating one application of the method of the invention;

Figure 2 is an enlarged fragmentary view showing the joint between ceramic sections of the envelope, and Figure 3 is a similar view showing the joint between ceramic and metal sections of the envelope.

In greater detail and referring first to Figure 1, the tube illustrated comprises a generally cylindrical evacuated envelope having a disk-shaped lower wall 2 of ceramic and a cylindrical side wall 3 also of ceramic. To facilitate assembly the wall sections 2 and 3 are preferably interfitted at the joint for self-alignment of the parts. This is done by providing a recess at the edge of the disk piece 2 for receiving the cylindrical piece 3.

The ceramic wall sections are metallically bonded together at joint 4 to form a vacuum-tight ceramic-to-ceramic seal involving a metalizing and brazing technique as hereinafter described in detail. This bonding layer also functions as a lead-in conductor for the grid. The ceramic used in making up the envelope is of the highly refractory type composed of a metallic oxide or oxides, such as zirconium or aluminum oxides. An alumina type ceramic body containing, say, 85% or more aluminum oxide ($Al_2O_3$) is preferred.

The upper portion of the envelope is formed by a cup-shaped copper anode 6, which anode has a flange 7 bonded to the ceramic wall section 3 at the joint 8. This ceramic-to-metal seal involves a bonding technique similar to that employed at the joint 4. A metal exhaust tubulation 9 at the upper end of the anode is pinched off at 11 after evacuation of the envelope.

Grid 12 in the tube is a cylindrical grid of the wire cage type located coaxially within anode 6. The grid is mounted on a tubular metal support 13, preferably of conical shape, with its lower flanged end adjacent to and connected with the metallic bond at joint 4. A grid terminal 16 is provided on the outer cylindrical surface of the envelope and is connected to the grid through the metallic bond, which terminal is preferably formed as a metalized area on the ceramic sections.

The tube illustrated has a filamentary type of cathode with vertical wire bars 17, say of thoriated tungsten, providing a generally cylindrical cathode structure lying within the grid. These filament wires are connected at the top to a disk 18 slidable on a center rod 19, half of the wires being connected at the lower ends to a bracket 21 and the other half to a similar bracket at the opposite side. These brackets are mounted on downwardly extending rods 22. Tensioning means for the filament wires comprise a sleeve 23 on the center rod pressed upwardly against disk 18 by a spring 24.

Center rod 19 and the side rods 22 are fastened to metal pins 26 extending through and bonded to the lower ceramic wall section 2. Suitable holes are provided in the ceramic disk for the pins and the latter are brazed at 27 to the upper inner surface of the disk. Areas of the ceramic around the upper edges of the holes are metalized for the purpose of making the brazes 27.

It is understood that the above tube structure is merely for purposes of illustration to show how ceramics metalized as described and claimed herein may be incorporated to provide a vacuum-tight envelope. Similar ceramic sections of various sizes and shapes may be used to make up many different kinds of envelopes, regardless of the particular electrode arrangements therein.

The method embodying my invention is more particularly illustrated in Figures 2 and 3, Figure 2 being an enlarged view of the ceramic-to-ceramic seal at the joint 4 between the ceramic sections 2 and 3, and Figure 3 being an enlarged view of the ceramic-to-metal seal at the joint 8 between ceramic section 3 and the copper anode flange 7. In both cases the ceramic is given a special treatment to metalize the surface prior to brazing the parts together.

The invention claimed herein resides in the procedure for metalizing the ceramic. The conventional practice in the past has been to apply metal particles directly to the surface of a ceramic body and then fire to sinter the metal to the ceramic. Such procedure relies largely upon a mechanical adherence or interlocking of the metal particles with the ceramic surface. This produces a fairly good mechanical bond but the joint is not sufficiently tight to give a dependable vacuum seal. Since the joint structure is used in the envelope of a vacuum tube, where leaks cannot be tolerated, this defect is serious.

In my copending application, Serial No. 302,192, filed August 1, 1952, I have disclosed an improved metalizing technique in which a metal oxide is first fired on the ceramic to produce a transition layer and then metal particles applied and sintered to provide a metalizing layer. This was a distinct advance over the conventional practice because the transition layer produced a tight union between the sintered particle and the ceramic and provided a vacuum-tight structure.

My present invention incorporates further improvements in such ceramic metalizing techniques and produces the desird metal-clad surface by a simpler procedure in which the metalizing layer is formed as an integral part of the underlying transition layer.

My present metalizing procedure comprises coating the ceramic with the molybdate of a metal such as copper or silver, but preferably the molybdate of a metal in the group comprising manganese, cobalt, nickel and iron. Of these, manganese molybdate ($MnMoO_4$) is preferred. The tungstates of the above metals, such as manganese tungstate ($MnWO_4$), may also be used but the molybdates are preferred. Using the preferred manganese molybdate as an example, I mix the powder with a binder, such as nitrocellulose lacquer, and apply it to the ceramic with a brush, coating only those surfaces which are to be metalized. A first coating about one mil thick is adequate.

The coated ceramic is then fired in an oxidizing atmosphere. For example, with an alumina type ceramic body coated with manganese molybdate it is satisfactory to fire in ordinary air for about 5 minutes at about 1100° C. In my preferred procedure the above steps are then repeated, namely, the ceramic is recoated and refired in air. This second air firing may be at a somewhat reduced temperature.

During the air firing operation, the inner portion of the manganese molybdate coating penetrates the ceramic and forms or begins the formation of a glassy layer shown at 28 in Figure 2. This glass-like transition layer includes constituents of the ceramic as well as those of the coating material, these being reconstituted or recrystalized in some complex combination of manganese, molybdenum, oxygen and also aluminum if the ceramic is an alumina type body.

The next step in the metalizing procedure is to fire the cramic body in a reducing atmosphere. For example, with the alumina type body coated with manganese molybdate, I prefer to fire in hydrogen for about 30 minutes at about 1250° C. During this hydrogen firing operation the outermost portions of the coating are reduced to metal, namely, to manganese and molybdenum. Because these are products of reduction, the metals are extremely finely divided. During the firing step such intimate mixture of finely divided metals is sintered or fused into a dense mass forming the layer indicated at 29 in Figure 2. It is also probable that the glassy transition layer 28 continues to form and penetrates during this last firing step.

I find that the outer metalizing layer 29 so formed is integrally united with the underlying glassy layer 28, the metal being tightly knitted to the glass-like transition layer. I also find that the transition layer is formed as an integral part of the ceramic body. All this is very important in a vacuum tube structure because the bonding at the metal surface must be vacuum-tight as well as mechanically strong.

Ceramic envelope sections so metalized and without further treatment may be brazed directly together or to other metal envelope parts. This is done by placing a wire of brazing material adjacent the joint as indicated by the dotted line 31 in Figure 1. The parts are then run through the furnace again with a reducing atmosphere and brought up to the melting point of the brazing metal, at which point the brazing material flows into the joint between the metalized surfaces and provides the brazing layer 32 as seen at the joint 4 in Figure 2. Copper-gold or copper-silver alloys are preferably used as the brazing material.

In the case of the joint 4, where an outside terminal 16 is also provided on the outer surfaces of the ceramic sections, the metalized areas are extended over the edge portions of the ceramics as shown in Figure 2. The metalizing layer 29 thus forms the outside layer and provides a metallic contact surface.

Referring to Figure 3 which shows the ceramic-to-metal seal at joint 8, it will be seen that the ceramic section 3 is metalized as previously described to provide a metalizing layer 29 and an underlying transition layer 28. After final brazing, a layer 32 of brazing material lies between the metalized ceramic and the copper flange member 7. The technique is thus similar to that first described except that the metalized ceramic is brazed directly to a metal member instead of to another ceramic piece.

While not necessary in most cases, the metalized areas of the ceramics may be electroplated with a metal such as copper or nickel prior to brazing the parts together. The plating, if desired, is readily done by suspending the metalized ceramic in an ordinary electroplating bath. Such additional plating step is less important in my present procedure because the improved method of metalizing by reducing a manganese molybdate or the like to metal inherently produces a dense metallic surface which is eminently suitable for brazing and provides a good contact terminal surface.

While I have described the brazing step as a separate firing operation after the metalizing has been completed, it is possible to combine the brazing operation with the last hydrogen firing step of the metalizing operation. In this shortened procedure the coated ceramics are first air fired and then assembled together with the brazing rings 31. One pass through the hydrogen furnace then suffices to reduce the metal in the coating and simultaneously brazes the parts together.

So far as I am aware, the firing times and temperatures are not critical, although it will be appreciated that in general they will vary inversely. The following times and temperatures are effective but are not intended to define useful limits, since wide variations are permissible.

Air fire: 2 minutes to 20 minutes—1125° C. to 1040° C.

Hydrogen fire: 20 minutes to 45 minutes—1300° C. to 1225° C.

Having thus described the invention, what is claimed as new and desired to be secured by Letters Patent is:

1. The method of metalizing an alumina type ceramic body, which comprises coating the ceramic with manganese molybdate, firing the coated ceramic in an oxidizing atmosphere at a temperature of about 1100° C., and then firing it in a reducing atmosphere at a temperature of about 1250° C.

2. The method of metalizing a ceramic body, which comprises coating the ceramic with a compound selected from the group consisting of metal molybdates and metal tungstates, firing the coated ceramic in an oxidizing atmosphere at a temperature of 1125° C. to 1040° C. for 2 to 20 minutes to form on the ceramic and by union therewith a glassy surface, and then firing it in a reducing atmosphere at a temperature of 1300° C. to 1225° C. for 20 to 45 minutes to provide an outer surface of metal integrally united with and overlying said glassy surface.

References Cited in the file of this patent

UNITED STATES PATENTS

| | | |
|---|---|---|
| 1,884,665 | Greiner | Oct. 25, 1932 |
| 2,468,402 | Kreidl et al. | Apr. 26, 1949 |

FOREIGN PATENTS

| | | |
|---|---|---|
| 581,545 | Great Britain | Oct. 16, 1946 |